United States Patent
Lee et al.

(10) Patent No.: US 8,238,280 B2
(45) Date of Patent: Aug. 7, 2012

(54) METHODS AND SYSTEMS FOR TRANSMISSION SCHEDULING DURING SLEEP MODE IN WIMAX NETWORKS

(75) Inventors: Kuo-Chun Lee, San Diego, CA (US); Patrick Lim, San Diego, CA (US); Yu Wang, San Diego, CA (US); Chun Woo Lee, San Ramon, CA (US); Guangming Carl Shi, San Diego, CA (US); Jong Ro Park, San Ramon, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 722 days.

(21) Appl. No.: 12/367,492

(22) Filed: Feb. 6, 2009

(65) Prior Publication Data

US 2010/0202333 A1     Aug. 12, 2010

(51) Int. Cl.
*G08C 17/00* (2006.01)
(52) U.S. Cl. ........................ 370/311; 455/343.1; 455/574
(58) Field of Classification Search .................. 370/311; 455/343.1, 574
See application file for complete search history.

(56) References Cited

U.S. PATENT DOCUMENTS

2007/0072578 A1* 3/2007 Lee et al. ............... 455/343.1
2009/0040937 A1* 2/2009 Xhafa et al. .................. 370/252

FOREIGN PATENT DOCUMENTS

WO   WO2006040769    4/2006
WO   WO2006132469    12/2006

OTHER PUBLICATIONS

Anastasi, et al., "Performance evaluation of power management for best effort applications in IEEE 802.16 networks" Wireless Conference, 2008. EW 2008. 14th European, IEEE, Piscataway, NJ, USA, Jun. 22, 2008, pp. 1-6, XP031320092.
International Search Report and Written Opinion—PCT/US10/023346, International Search Authority—European Patent Office, May 3, 2010.
Mohammad, et al., "Power Consumption Evaluation of Sleep Mode in the IEEE 802.16e MAC with Multi Service Connections" Signal Processing and Communications, 2007. ICSPC 2007. IEEE International Conference on, IEEE Piscataway, NJ, USA, Nov. 24, 2007, pp. 1363-1366, XP031380785.

* cited by examiner

*Primary Examiner* — Albert T Chou
(74) *Attorney, Agent, or Firm* — Charles Chesney (57) ABSTRACT

Certain embodiments of the present disclosure allow data for a second connection to be exchanged while the second connection is in a low power state that overlaps with a listening interval of a first connection.

28 Claims, 11 Drawing Sheets

L: Listening Interval; S: Sleep Interval
A: Available Interval; U: Unavailable Interval

METHODS AND SYSTEMS FOR TRANSMISSION SCHEDULING DURING SLEEP MODE IN WIMAX NETWORKS

FIELD

Certain embodiments of the present disclosure generally relate to wireless communication and, more particularly, to a mobile station maintaining multiple connections with a serving base station.

SUMMARY

Certain embodiments of the present disclosure provide a method for wireless communications by a mobile device. The method generally includes entering a first low power state with respect to a first connection in accordance with a first PSC, entering a second low power state with respect to a second connection in accordance with a second PSC, and utilizing bandwidth allocated to the first connection to exchange data relevant to the second connection during an overlapping period of a listening window of the first connection and a sleep window of the second connection.

Certain embodiments provide an apparatus for wireless communications by a mobile device. The apparatus can include logic for entering a first low power state with respect to a first connection in accordance with a first power saving class (PSC), logic for entering a second low power state with respect to a second connection in accordance with a second PSC, and logic for utilizing bandwidth allocated to the first connection to exchange data relevant to the second connection during an overlapping period of a listening window of the first connection and a sleep window of the second connection.

Certain embodiments provide an apparatus for wireless communications by a mobile device. The apparatus generally includes means for entering a first low power state with respect to a first connection in accordance with a first power saving class (PSC), means for entering a second low power state with respect to a second connection in accordance with a second PSC, and means for utilizing bandwidth allocated to the first connection to exchange data relevant to the second connection during an overlapping period of a listening window of the first connection and a sleep window of the second connection.

Certain embodiments provide a computer-program product for wireless communications by a mobile device, comprising a computer readable medium having instructions stored thereon, the instructions being executable by one or more processors. The instructions generally include instructions for entering a first low power state with respect to a first connection in accordance with a first power saving class (PSC), instructions for entering a second low power state with respect to a second connection in accordance with a second PSC, and instructions for utilizing bandwidth allocated to the first connection to exchange data relevant to the second connection during an overlapping period of a listening window of the first connection and a sleep window of the second connection.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted that the appended drawings illustrate only certain typical embodiments of this disclosure and are therefore not to be considered limiting of its scope, for the description may admit to other equally effective embodiments.

DETAILED DESCRIPTION

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

In an effort to conserve power at the MS, the IEEE 802.16 standard defines power saving classes (PSCs), where the MS may power down one or more components during sleep windows, or more generically, low power windows. The MS periodically wakes up to monitor for activity during intermittent listening windows to decide whether the PSC should be activated. The MS may activate PSCs separately for different connections with the same base station. Unfortunately, however, the MS must power up components during the listening window for each connection. Because the listening window for one connection may overlap with the sleep, or low power, window for another connection, power saving is not optimal.

Certain embodiments of the present disclosure allow a mobile station to utilize bandwidth of a first connection to transmit or receive data relevant to a second connection, when a listening window of the first connection overlaps with a low power window of the second connection.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
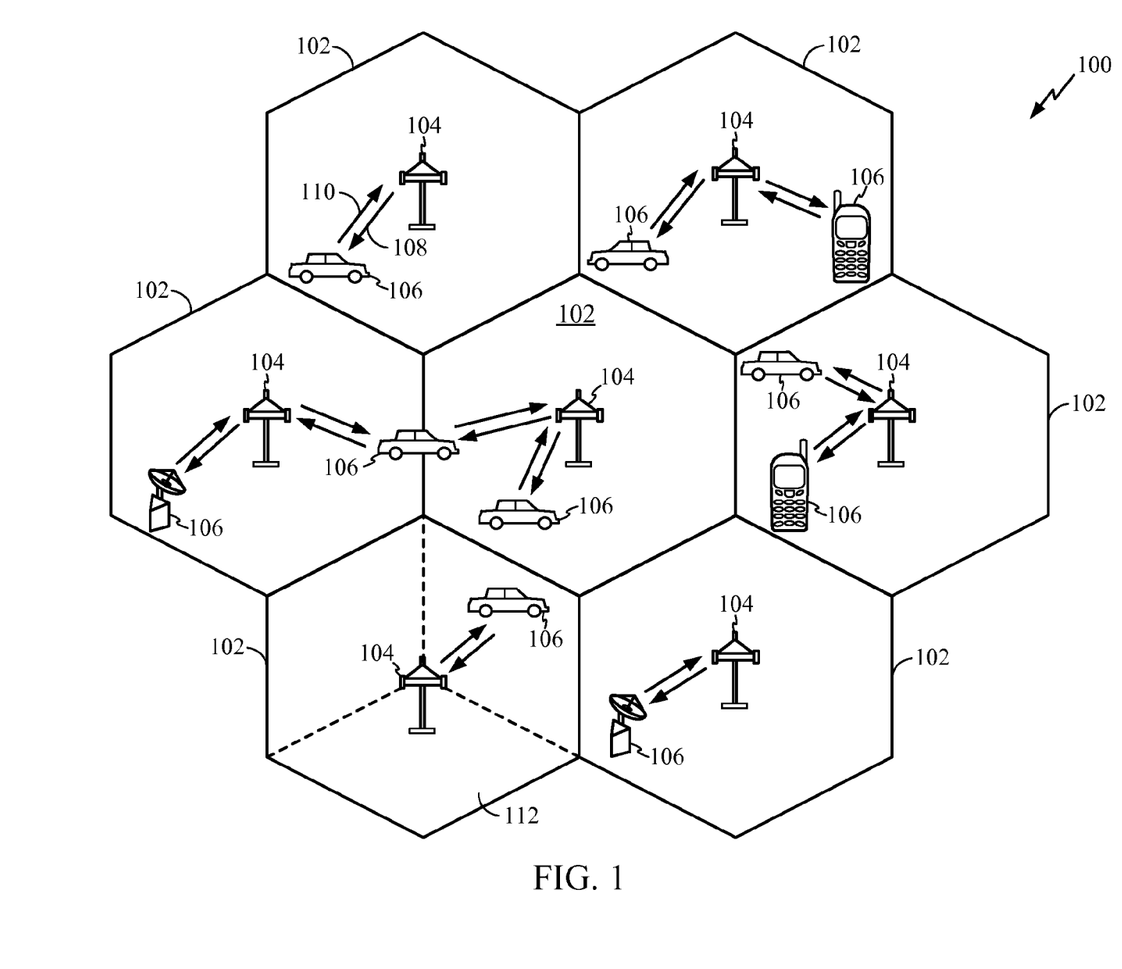
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
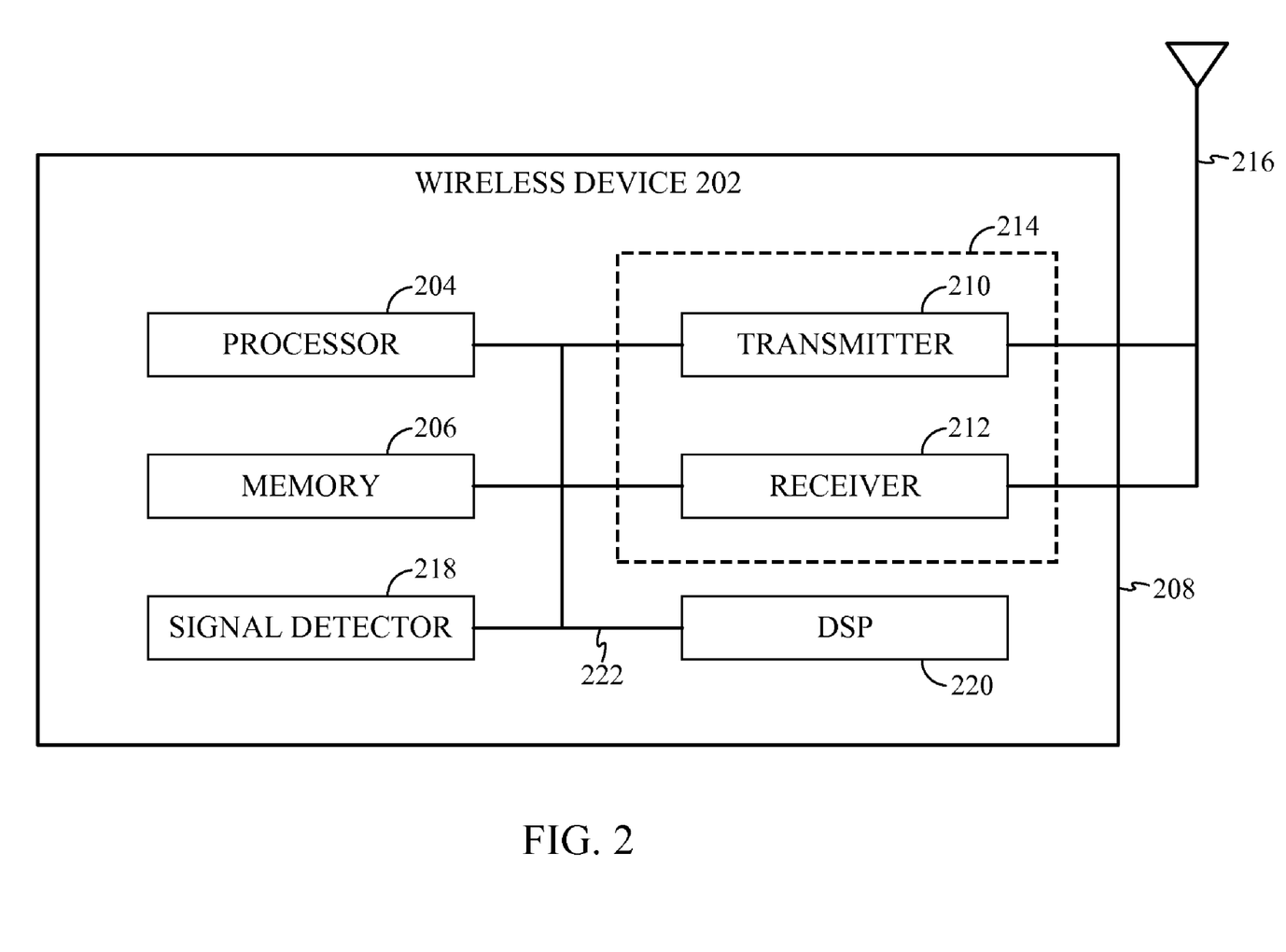
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in memory 206 may be executable to implement methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
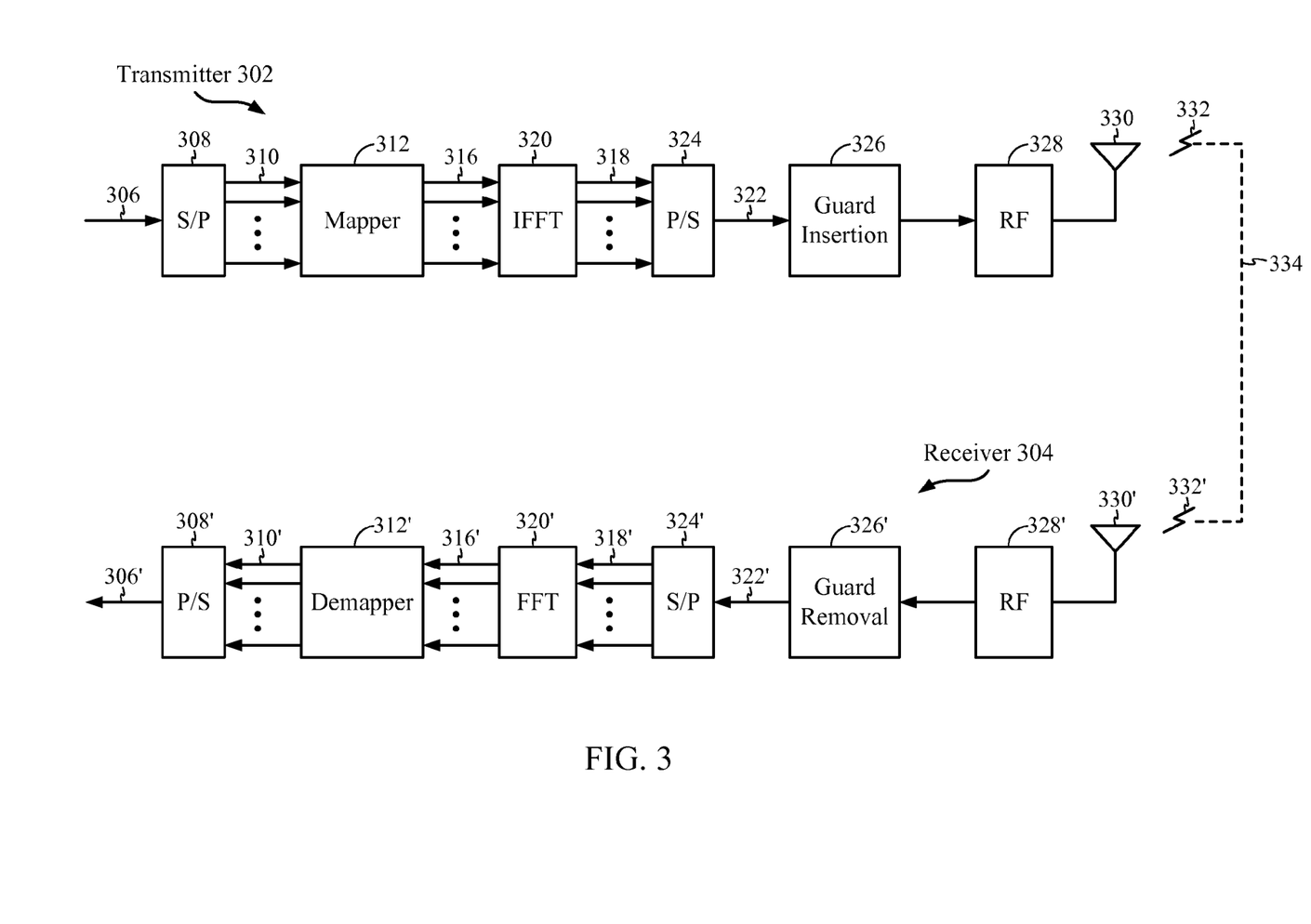
FIG. 3 illustrates an example transmitter and receiver that may be used within a wireless communication system that utilizes orthogonal frequency-division multiplexing (OFDM) and orthogonal frequency division multiple access (OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. Transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Exemplary Transmission Scheduling of Multiple Power Saving Classes in the Sleep Mode Operation of WiMAX Systems Support for different types of Quality of Service (QoS) is a part of the WiMAX standard(s). Strong QoS support may be achieved by using a connection-oriented MAC architecture. To facilitate QoS control, before any data transmission happens, the BS and the MS establish a unidirectional logical link, generally referred to as a connection, between the two MAC-layer peers. In some instances, a MS and a BS may establish several connections at any given time. Each connection may be identified by a connection identifier (CID), which serves as a temporary address for data transmissions over the particular link.

To support a wide variety of applications with different data delivery needs, the WiMAX standard defines a variety of different scheduling or data delivery services that should be supported by a BS's MAC scheduler for data transport over a connection. These scheduling or data delivery services include unsolicited grant service (UGS), real-time variable rate (RT-VR), extended real-time variable rate (ERT-VR), non-real-time variable rate (NRT-VR), and best effort (BE). As each connection between a BS and a MS is individually identifiable with the use of the CID, each connection may be, to some degree, independent from all other connections between said BS and MS and different connections may have different scheduling services.

Figure 4:
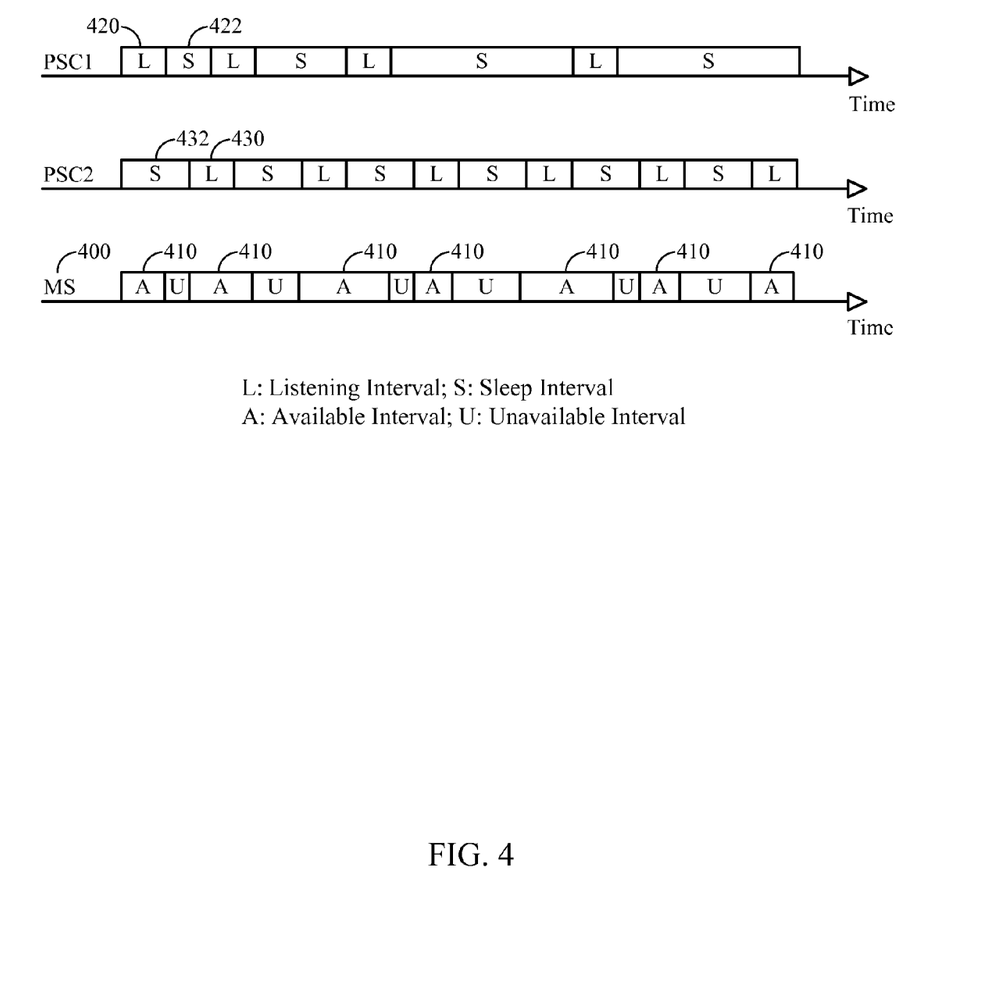
FIG. 4 illustrates the availability of a mobile station based on the activity of a plurality of connections.

Additionally, an MS may be available if at least one power saving class (PSC) is in a listening window. FIG. 4 illustrates the availability 410 of an MS 400 based on the activity of two PSCs (e.g., PSC1 and PSC2). For example, PSC1 may have a sleep window 422 that increases over time while a listening window 420 remains constant in duration. In contrast, PSC2 may have a sleep window 432 and a listening window 430 that remain constant in duration. The result, in this example, is an MS 400 with an aperiodic sleep cycle in which MS is available to a serving BS during either the listening window 420 of PSC1 or the listening window 430 of PSC2.

As a result of the sleep window duration of various PSCs being independent with respect to one another, the MS 400 may utilize available bandwidth in a less than optimally efficient manner. For example, the MS 400 may have un-utilized BW available during the listening window allotted to a first connection in accordance with a first PSC (e.g., PSC1); however, the transmission of data on a second connection may be unnecessarily postponed until the listening window allotted to the second connection in accordance with a second PSC (e.g., PSC2).

Accordingly, embodiments of the present disclosure may enable the MS 400 to utilize bandwidth of a first PSC in a listening window to transmit or receive data relevant to a second PSC in a sleep window.

To enable the MS 400 to utilize bandwidth of a first PSC in a listening window to transmit or receive data relevant to a second PSC in a sleep window, certain embodiments may provide one or more new parameters to the definition of a PSC. For example, certain embodiments may provide one or more bandwidth utilization flags indicating whether or not a PSC in its sleep window is allowed to transmit/receive data during the listening window of other PSCs. In some instances, the bandwidth utilization flag(s) with a value of zero (e.g., not set) may indicate that the PSC in its sleep window is not allowed to transmit or receive data during the listening window of other PSCs, while a value of one (e.g., set) may indicate that the PSC in its sleep window is allowed to transmit/receive data during the listening window of other PSCs.

Some embodiments may provide a precedence flag indicating whether or not a PSC in its listening window has a higher priority than other PSCs in the sleep window. For example, a precedence flag with a value of zero may indicate that the PSC in its listening window has the same priority as other PSCs in the sleep window, while a precedence flag with a value of one may indicate that the PSC in its listening window has a higher priority than PSCs in the sleep window.

In some embodiments, both the precedence flag and the bandwidth utilization flag may be defined through a WiMAX PSC activation procedure. For example, both the precedence flag and the bandwidth utilization flag may be defined using a MOB_SLP-REQ or a MOB_SLP-RSP MAC management message exchanged between the MS and the BS prior to the PSC activation.

Figure 5:
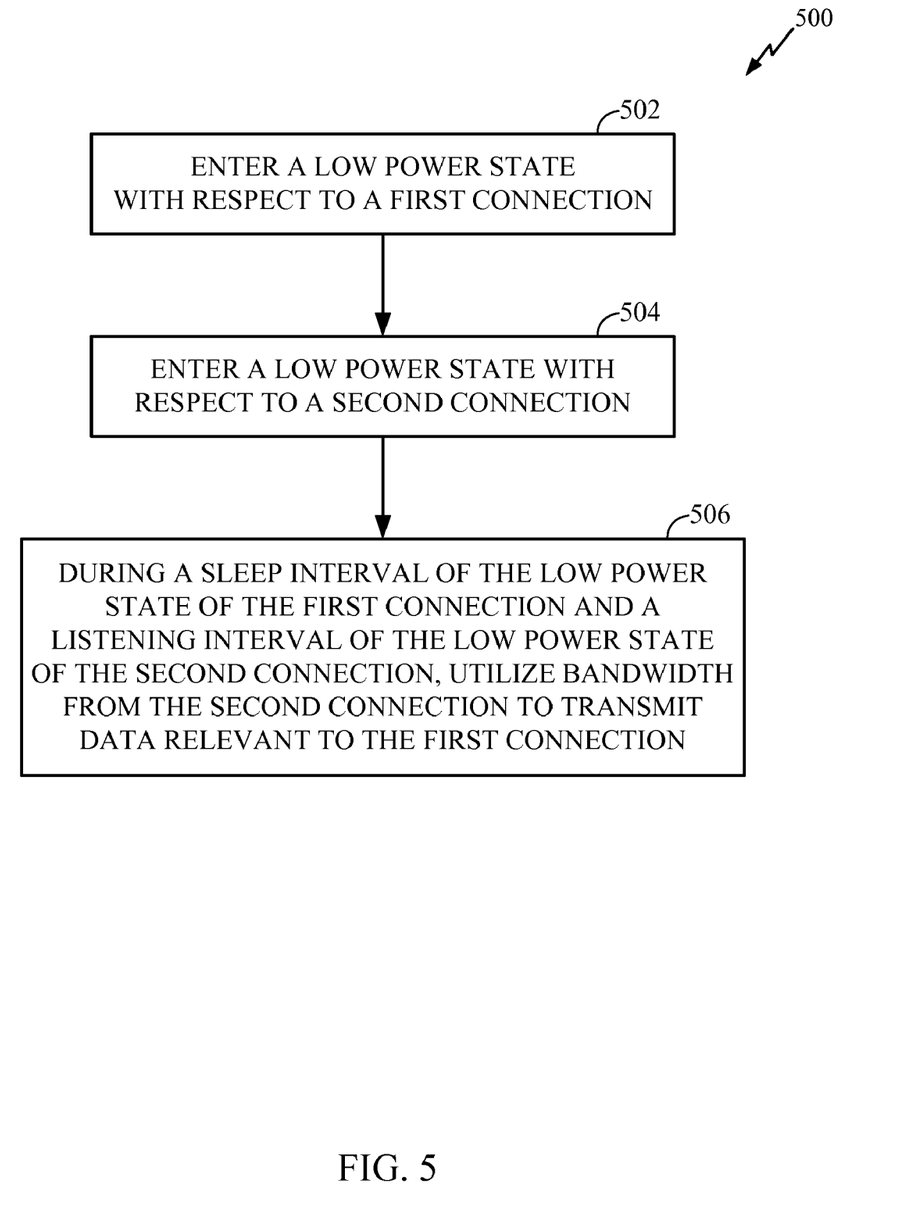
FIG. 5 illustrates example operations for utilizing bandwidth from an active connection for data relevant to an inactive connection.

FIG. 5 illustrates example operations which may be employed by an MS 400 in utilizing bandwidth of a second PSC in a listening window to transmit or receive data relevant to a first PSC in a sleep window. The operations 500 may be performed, e.g., by an MS in an effort to allow the MS to better utilize available bandwidth (BW).

Operations begin, at 502, with the MS 400 selecting a first PSC for a first connection and entering a low power state with respect to the first connection. As described above, the low power state may include one or more sleep windows, or one or more low power windows, as well as one or more listening windows. The duration and frequency of these windows may be based, at least in part, on the selected PSC. For example, a PSC of type 1 may have a listening window that remains constant in duration while each subsequent sleep window is twice the size of the previous sleep window, but not greater than the largest specified sleep window. In contrast, a PSC of type 2 may have a listening window that remains constant in duration while the sleep window also remains constant in duration.

At 504, the MS may select a second PSC for a second connection and enter a low power state with respect to the second connection. As described above, the low power state may include one or more sleep windows, or one or more low power windows, as well as one or more listening windows. At 506, during a sleep window allotted to the first connection and a listening window allotted to the second connection, the MS 400 may utilize BW allotted to the second connection to transmit or receive data relevant to the first connection.

Figure 6:
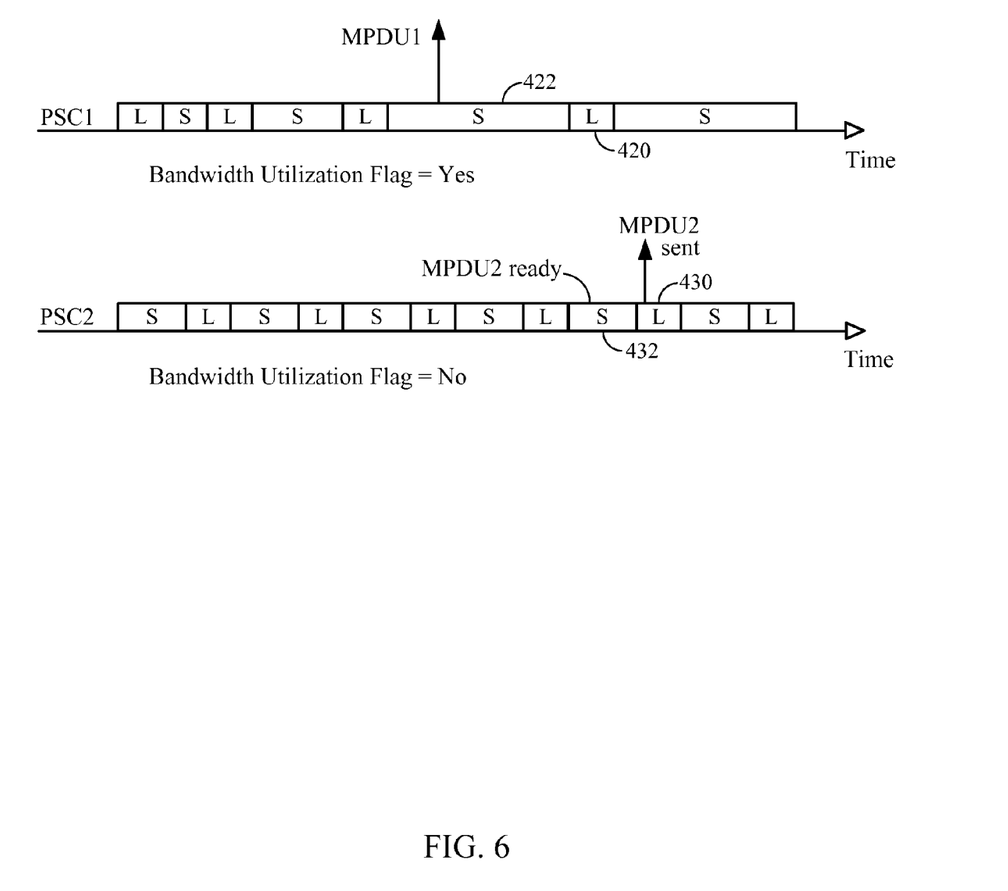
FIG. 6 illustrates a connection utilizing bandwidth during a period of inactivity, in accordance with embodiments of the present disclosure.

FIG. 6 illustrates an application of example operations 500, in accordance with embodiments of the present disclosure. In this example, an MS 400 has a first connection and a second connection. In some instances, MS 400 may enter a low power state with respect to the first connection in accordance with a first PSC. For example, MS 400 may determine that the first connection has a BE or NRT-VR quality of service QoS and may select a PSC of type I when entering the first low power state. While in the low power state with respect to the first connection, the MS 400 may enter into a low power state with respect to the second connection in accordance with a second PSC. For example, the MS 400 may determine that the second connection has a UGS or RT-VR QoS and may select a PSC of type II when entering the second low power state.

At some arbitrary point in time, the MS 400 may have data relevant to the first connection ready to be transmitted or received, for example, a MAC protocol data unit (MPDU). However, the first connection may be in a sleep window. If the selected PSC (e.g., PSC1) has been defined to utilize the BW of another active PSC to transmit or receive MPDUs during sleep windows 422, the MS 400 may not need to wait until a listening window 420 in sending or receiving the MPDU, as illustrated with MPDU1. In certain embodiments, the MS 400 may employ a bandwidth utilization flag when defining a PSC to utilize the BW of another active PSC to transmit or receive MPDUs during sleep windows. However, if the selected PSC (e.g., PSC2) has not been defined to utilize the BW of another active PSC to transmit or receive MPDUs during sleep windows 432, the MS 400 may need to wait until the subsequent listening window 430 before sending or receiving the MPDU, as illustrated with MPDU2.

In some instances, a first PSC may be defined to utilize the BW of a second connection to transmit or receive MPDUs during sleep windows; however, the second connection may be utilizing its allotted BW to transmit or receive its own MPDUs. Accordingly, embodiments of the present disclosure may also provide an additional parameter to the definition of a PSC to determine precedence between connections employing different PSCs when utilizing BW allotted to a connection with one PSC to transmit or receive the MPDUs relevant to a connection with another PSC.

Figure 7:
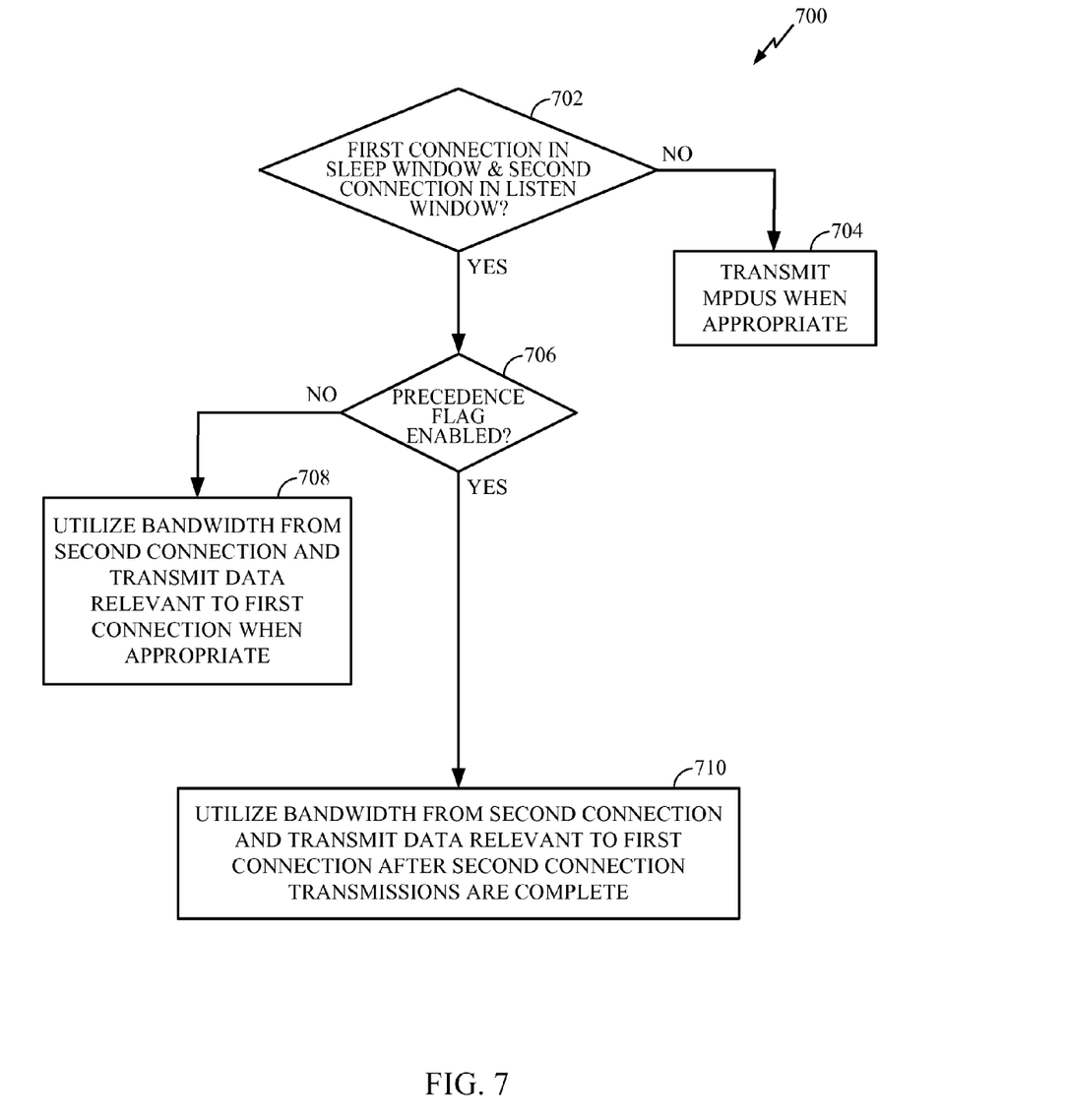
FIG. 7 illustrates example operations for establishing precedence when utilizing bandwidth from an active connection.

FIG. 7 illustrates example operations for establishing precedence between connections employing different PSCs when utilizing BW allotted to a connection with one PSC to transmit or receive the MPDUs relevant to a connection with another PSC. The operations 700 may be performed, e.g., by an MS employing at least two connections with two or more different PSCs, at least a first PSC defined such that the MS may utilize BW allotted to a second connection to transmit or receive data relevant to the first connection.

Operations begin, at 702, with an MS determining if the first connection with a first PSC is in a sleep window and if a second connection with a second PSC is in a listening window. If either the first connection is not in a sleep window or the second connection is not in a listening window, the MS may transmit the MPDU when appropriate, as illustrated at 704. For example, if both the first connection and the second connection are in the listening windows, the MS may transmit the MPDUs on a first come first served basis. Alternatively, the MS may schedule transmission of the MPDUs based on the QoS parameters of the first and the second connections.

However, if the first connection is in a sleep window and the second connection is in a listening window, the MS may determine if a precedence flag is enabled, at 706. In some embodiments, the MS may examine the precedence flag of the second connection to determine if data relevant to the second connection has priority over data relevant to the first connection.

If the precedence flag for the second connection is not enabled, the MS, at 708, may utilize BW allotted to the second connection to transmit or receive MPDUs relevant to the first connection when appropriate.

Figure 8A:
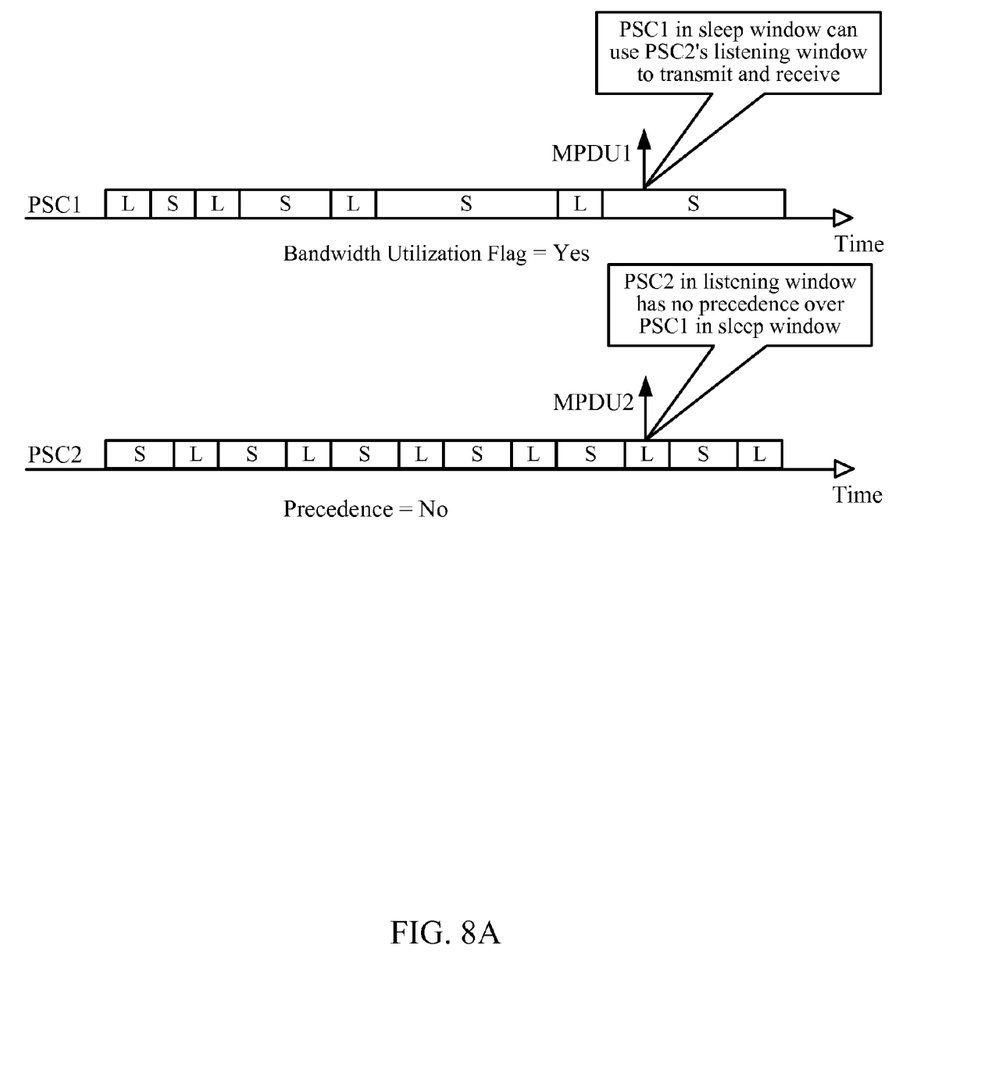
FIG. 8A illustrates a connection utilizing bandwidth during a period of inactivity when a precedence bit is not enabled, in accordance with embodiments of the present disclosure.

For example, FIG. 8A illustrates a scenario where an MS has two connections with two different PSCs. The first connection is in a low power state in accordance with a PSC of type I. In contrast, the second connection is in a low power state in accordance with a PSC of type II. In the present example, the PSC of the first connection is defined such that it is able to utilize the BW allotted to the second connection to transmit or receive MPDUs relevant to the first connection. Moreover, the PSC of the second connection is defined such that MPDUs relevant to the second connection do not have precedence over MPDUs relevant to the first connection, even if the second connection is in a listening window. Accordingly, when the MS has both an MPDU relevant to the first connection and an MPDU relevant to the second connection ready to be transmitted or received (e.g., MPDU1 and MPDU2), the MS may process the MPDUs on a first come first served basis.

In contrast, if the precedence flag for the second connection is enabled, the MS, at 710, may utilize BW allotted to the second connection to transmit or receive MPDUs relevant to the first connection after the transmission or reception of MPDUs relevant to the second connection.

Figure 8B:
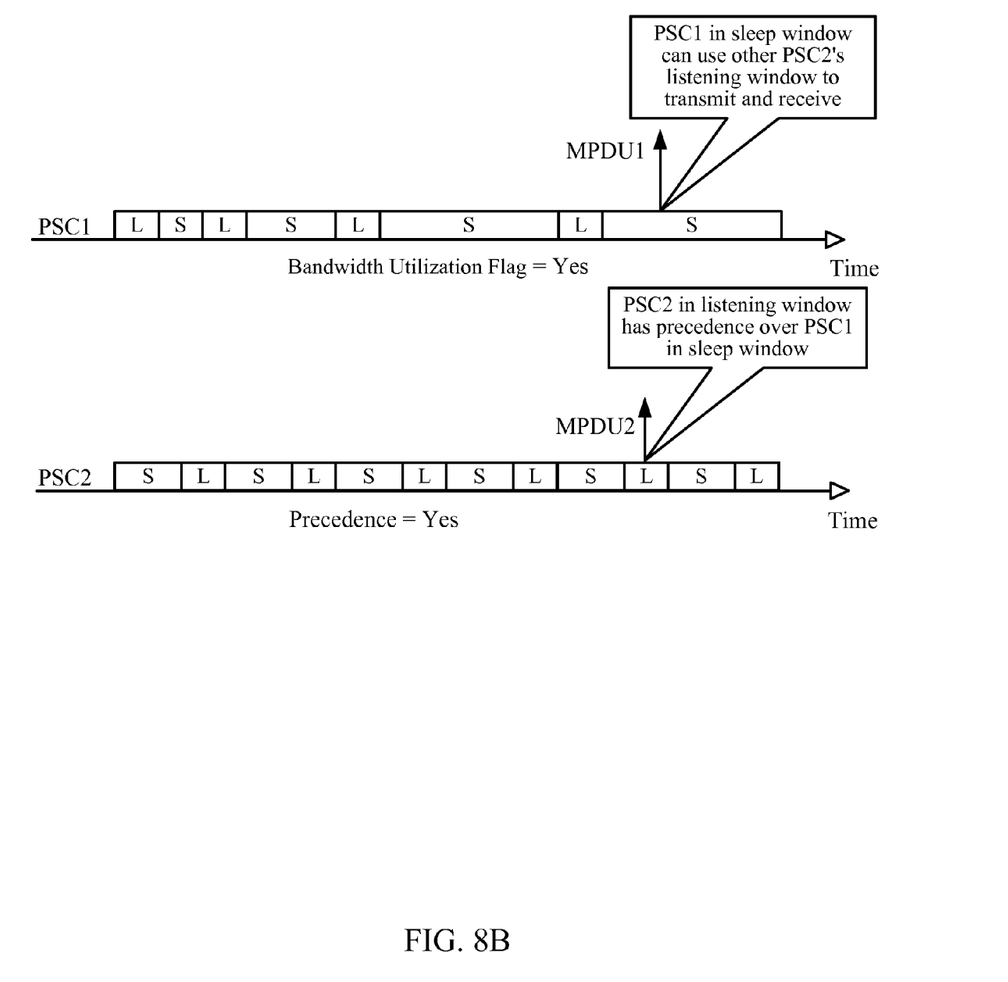
FIG. 8B illustrates a connection utilizing bandwidth during a period of inactivity when a precedence bit is enabled, in accordance with embodiments of the present disclosure.

For example, FIG. 8B illustrates a scenario similar to the one illustrated in FIG. 8A save for the PSC of the second connection being defined such that MPDUs relevant to the second connection have precedence over MPDUs relevant to the first connection (i.e., a precedence flag of PSC2 is enabled). Since the precedence flag of PSC2 is enabled when the MS has both an MPDU relevant to the first connection and an MPDU relevant to the second connection ready to be transmitted or received (e.g., MPDU1/2), the MS may process the MPDU relevant to the first connection (MPDU1) after the MS processes the MPDU relevant to the second connection (MPDU2).

Figure 5A:
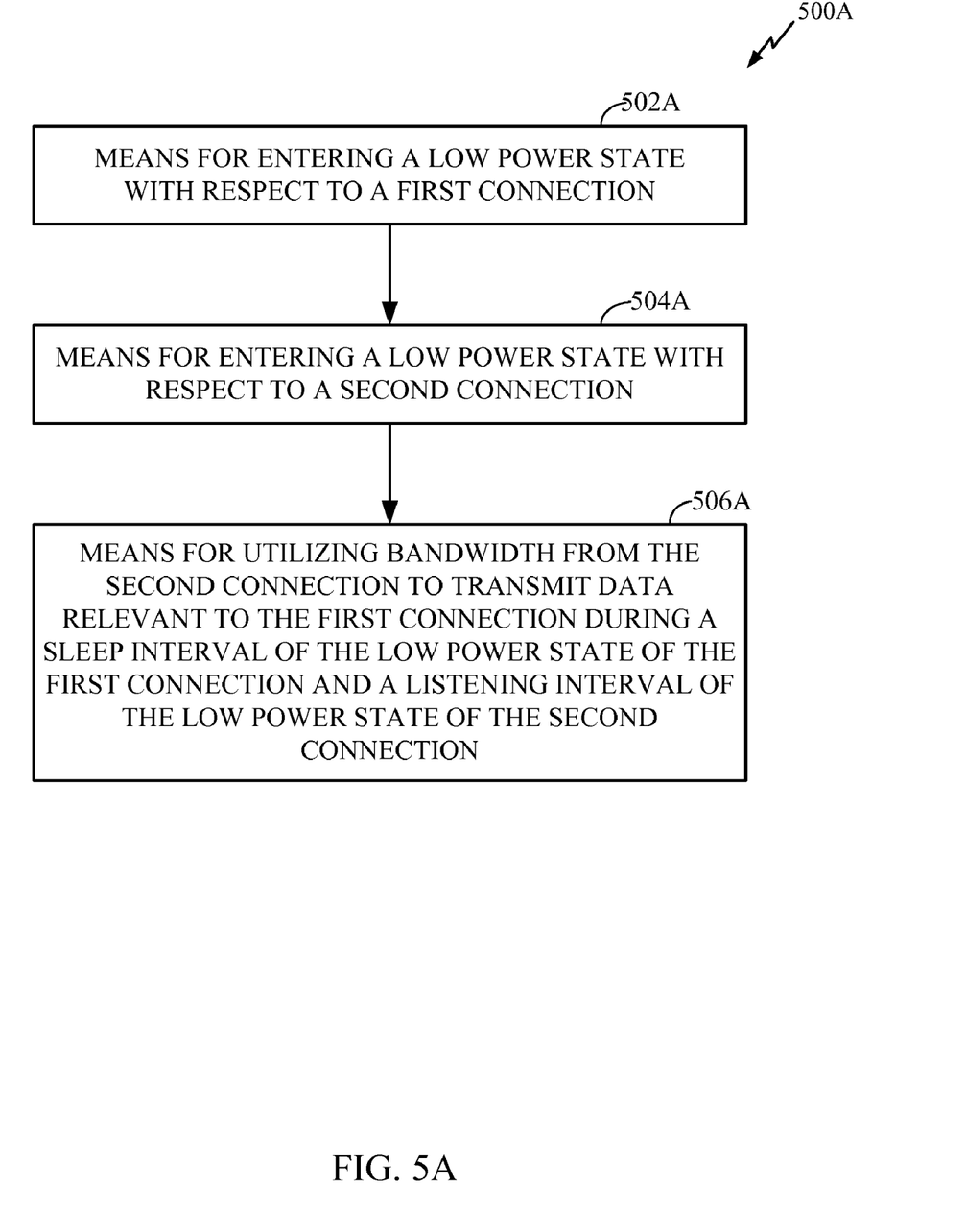
FIG. 5A is a block diagram of means corresponding to the example operations of FIG. 5.
Figure 7A:
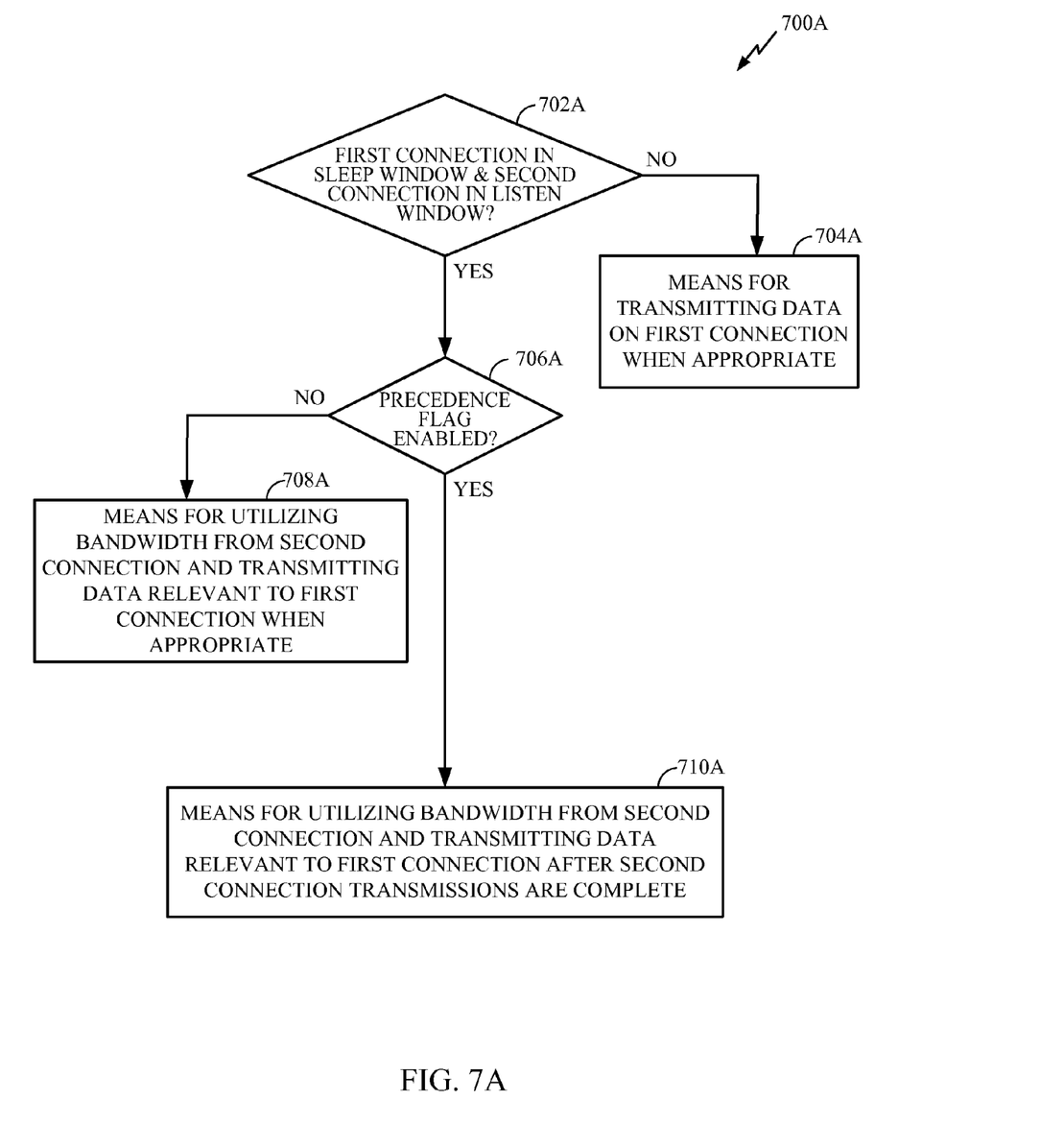
FIG. 7A is a block diagram of means corresponding to the example operations of FIG. 7.

The various operations described herein may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 502-506 illustrated in FIG. 5 correspond to means-plus-function blocks 502A-506A illustrated in FIG. 5A. Similarly, blocks 702-710 illustrated in FIG. 7 correspond to means-plus-function blocks 702A-710A illustrated in FIG. 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for wireless communications performed by a mobile device, comprising:
   entering, by a mobile device, a first low power state with respect to a first connection in accordance with a first power saving class (PSC);
   entering, by the mobile device, a second low power state with respect to a second connection in accordance with a second PSC; and
   utilizing, by the mobile device, bandwidth allocated to the first connection to exchange data relevant to the second connection during an overlapping period of a listening window of the first connection and a sleep window of the second connection.

2. The method of claim 1, wherein utilizing bandwidth allocated to the first connection comprises:
   transmitting one or more Media Access Control (MAC) protocol data units (MPDUs) relevant to the second connection during the listening window of the first connection.

3. The method of claim 1, further comprising:
   setting one or more flags to indicate it is allowable for the second connection to utilize the bandwidth of the first connection.

4. The method of claim 3, wherein utilizing bandwidth allocated to the first connection comprises:
   exchanging data relevant to the second connection after determining the one or more flags have been set.

5. The method of claim 3, wherein setting the one or more flags comprises:
   sending a MOB_SLP-REQ or MOB_SLP-RSP message indicating it is allowable for the second connection to utilize the bandwidth of the first connection.

6. The method of claim 1, wherein utilizing bandwidth allocated to the first connection comprises:
   first determining if the exchange of data relevant to the first connection has priority over the exchange of data relevant to the second connection.

7. The method of claim 6, wherein utilizing bandwidth allocated to the first connection comprises:
   determining that the exchange of data relevant to the first connection has priority over the exchange of data relevant to the second connection; and
   exchanging data relevant to the second connection after data relevant to the first connection has been exchanged.

8. An apparatus for wireless communications by a mobile device, comprising:
   logic for entering a first low power state with respect to a first connection in accordance with a first power saving class (PSC);
   logic for entering a second low power state with respect to a second connection in accordance with a second PSC; and
   logic for utilizing bandwidth allocated to the first connection to exchange data relevant to the second connection during an overlapping period of a listening window of the first connection and a sleep window of the second connection.

9. The apparatus of claim 8, wherein the logic for utilizing bandwidth allocated to the first connection comprises:
   logic for transmitting one or more Media Access Control (MAC) protocol data units (MPDUs) relevant to the second connection during the listening window of the first connection.

10. The apparatus of claim 8, further comprising:
    logic for setting one or more flags to indicate it is allowable for the second connection to utilize the bandwidth of the first connection.

11. The apparatus of claim 10, wherein the logic for utilizing bandwidth allocated to the first connection is configured to:
    exchange data relevant to the second connection after determining the one or more flags have been set.

12. The apparatus of claim 10, wherein the logic for setting the one or more flags comprises:
    logic for sending a MOB_SLP-REQ or MOB_SLP-RSP message indicating it is allowable for the second connection to utilize the bandwidth of the first connection.

13. The apparatus of claim 8, wherein the logic for utilizing bandwidth allocated to the first connection comprises:
    logic for first determining if the exchange of data relevant to the first connection has priority over the exchange of data relevant to the second connection.

14. The apparatus of claim 13, wherein the logic for utilizing bandwidth allocated to the first connection comprises:
    logic for determining that the exchange of data relevant to the first connection has priority over the exchange of data relevant to the second connection; and
    logic for exchanging data relevant to the second connection after data relevant to the first connection has been exchanged.

15. An apparatus for wireless communications by a mobile device, comprising:
    means for entering a first low power state with respect to a first connection in accordance with a first power saving class (PSC);
    means for entering a second low power state with respect to a second connection in accordance with a second PSC; and
    means for utilizing bandwidth allocated to the first connection to exchange data relevant to the second connection during an overlapping period of a listening window of the first connection and a sleep window of the second connection.

16. The apparatus of claim 15, wherein the means for utilizing bandwidth allocated to the first connection comprise:
    means for transmitting one or more Media Access Control (MAC) protocol data units (MPDUs) relevant to the second connection during the listening window of the first connection.

17. The apparatus of claim 15, further comprising:
    means for setting one or more flags to indicate it is allowable for the second connection to utilize the bandwidth of the first connection.

18. The apparatus of claim 17, wherein the means for utilizing bandwidth allocated to the first connection are configured to:
    exchange data relevant to the second connection after determining the one or more flags have been set.

19. The apparatus of claim 17, wherein the means for setting one or more flags comprise:
    means for sending a MOB_SLP-REQ or MOB_SLP-RSP message indicating it is allowable for the second connection to utilize the bandwidth of the first connection.

20. The apparatus of claim 15, wherein the means for utilizing bandwidth allocated to the first connection comprise:
    means for first determining if the exchange of data relevant to the first connection has priority over the exchange of data relevant to the second connection.

21. The apparatus of claim 20, wherein the means for utilizing bandwidth allocated to the first connection comprise:
  means for determining that the exchange of data relevant to the first connection has priority over the exchange of data relevant to the second connection; and
  means for exchanging data relevant to the second connection after data relevant to the first connection has been exchanged.

22. A computer-program product for wireless communications by a mobile device, comprising a non-transitory computer readable medium having instructions stored thereon, the instructions being executable by one or more processors for causing the mobile device to:
  enter a first low power state with respect to a first connection in accordance with a first power saving class (PSC);
  enter a second low power state with respect to a second connection in accordance with a second PSC; and
  utlilize bandwidth allocated to the first connection to exchange data relevant to the second connection during an overlapping period of a listening window of the first connection and a sleep window of the second connection.

23. The computer-program product of claim 22, further comprising:
  instructions for causing the mobile device to transmit one or more Media Access Control (MAC) protocol data units (MPDUs) relevant to the second connection during the listening window of the first connection.

24. The computer-program product of claim 22, further comprising:
  instructions for causing the mobile device to set one or more flags to indicate it is allowable for the second connection to utilize the bandwidth of the first connection.

25. The computer-program product of claim 24, further comprising:
  instructions for causing the mobile device to exchange data relevant to the second connection after determining the one or more flags have been set.

26. The computer-program product of claim 24, further comprising:
  instructions for causing the mobile device to send a MOB_SLP-REQ or MOB_SLP-RSP message indicating it is allowable for the second connection to utilize the bandwidth of the first connection.

27. The computer-program product of claim 22, further comprising:
  instructions for causing the mobile device to first determine if the exchange of data relevant to the first connection has priority over the exchange of data relevant to the second connection.

28. The computer-program product of claim 27, further comprising:
  instructions for causing the mobile device to determine that the exchange of data relevant to the first connection has priority over the exchange of data relevant to the second connection; and
  instructions for causing the mobile device to exchange data relevant to the second connection after data relevant to the first connection has been exchanged.

* * * * *